(12) United States Patent
Wu et al.

(10) Patent No.: US 7,756,950 B2
(45) Date of Patent: Jul. 13, 2010

(54) SYSTEM AND METHOD FOR PROVIDING MOBILE INFORMATION SERVER AND PORTABLE DEVICE THEREIN

(75) Inventors: Hsu-Chih Wu, Yilan County (TW); Chih-Chung Kuo, Hsinchu (TW); Chieh-Chih Chang, Taoyuan County (TW); Miao-Ru Hsu, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 961 days.

(21) Appl. No.: 11/309,059

(22) Filed: Jun. 15, 2006

(65) Prior Publication Data

US 2007/0180058 A1 Aug. 2, 2007

(30) Foreign Application Priority Data

Jan. 27, 2006 (TW) .............................. 95103393 A

(51) Int. Cl.
*G06F 15/16* (2006.01)
(52) U.S. Cl. ................................................... 709/219
(58) Field of Classification Search .................. 709/217
See application file for complete search history.

(56) References Cited

U.S. PATENT DOCUMENTS 6,012,083 A * 1/2000 Savitzky et al. ............. 709/202
6,748,358 B1 * 6/2004 Iwasaki et al. ............... 704/258
6,845,374 B1 * 1/2005 Oliver et al. .................... 707/5
2002/0138582 A1 * 9/2002 Chandra et al. ............. 709/206
2004/0139235 A1 * 7/2004 Rashid et al. ............... 709/248
2004/0186713 A1 * 9/2004 Gomas et al. ............... 704/235
2004/0224675 A1 * 11/2004 Puskoor et al. .............. 455/419
2005/0240756 A1 * 10/2005 Mayer ........................... 713/2
2006/0253776 A1 * 11/2006 Ohkawa ...................... 715/530

FOREIGN PATENT DOCUMENTS

| TW | 514841 | 12/2002 |
| TW | 547735 | 8/2003 |
| TW | 589592 | 6/2004 |

* cited by examiner

*Primary Examiner*—Wing F Chan
*Assistant Examiner*—Andrew Woo
(74) *Attorney, Agent, or Firm*—Jianq Chyun IP Office

(57) ABSTRACT

A system and method for providing mobile information, a server and a portable device therein are provided. The server comprises an intelligent download manager and the portable device comprises a file browse manager. The intelligent download manager determines a downloaded file update rule and a file browse rule according to any combination of a document attribute, a browse record, and a document preference. The files to be downloaded to the portable device can be determined automatically according to the downloaded file update rule. The file browse manager provides an intelligent browse mode related to the browse sequence of the downloaded files according to the file browse rule. Therefore, information really interesting to the user can be stored in the limited space by the present invention and the user can access the information quickly and efficiently.

33 Claims, 2 Drawing Sheets

SYSTEM AND METHOD FOR PROVIDING MOBILE INFORMATION SERVER AND PORTABLE DEVICE THEREIN

CROSS-REFERENCE TO RELATED APPLICATION

This application claims the priority benefit of Taiwan application serial no. 95103393, filed on Jan. 27, 2006. All disclosure of the Taiwan application is incorporated herein by reference.

BACKGROUND OF THE INVENTION

1. Field of Invention

The present invention relates to a method and system for providing information, and more particularly, to a method and system for providing mobile information by using a server and a portable device.

2. Description of Related Art

In recent years, the development of mobile learning has become increasingly important. With the development of mobile devices such as mobile phones, personal data assistants (PDAs), and MP3 walkmans, as well as the evolution of mobile communication and wireless communication technology, the hardware limits of mobile learning has been gradually decreased.

Take two examples below to illustrate the currently common scenarios of learning by mobile devices.

Example one: Supposing that a user wants to learn about a certain famous person for a while, but it is inconvenient to read on his/her way to work or school, then fragments of time such as the time of driving, taking buses, and walking can be used to listen to the information with a portable device.

Example two: In language learning, "repeated practice" is a key point. After a user has finished reading an article, he/she would like to read some other articles of a similar degree of reading difficulty to enhance his/her understanding and application of certain grammar or certain sentence patterns by repeated practice. If many related articles of the same type can be collected at this time, time that is unsuitable for conventional learning can be used for listening with a portable device, thus enhancing learning efficiency.

However, the above two scenarios of mobile learning encounter some common issues, i.e. the convenience of acquiring contents and propriety of contents. As for example one, the convenience of acquiring contents is very important. If acquisition and arrangement of the contents are time consuming, the meaning of being able to listen to the information with a portable device would become particularly trifling. The user will not exert his/her effort to arrange and download the information to the portable device. As for example two, the propriety and the broadness of the source of obtaining contents are described. Currently, most content resources of digital learning and mobile learning need to be selected manually. Although the accuracy of information selected manually can be guaranteed, the broadness and variety of the contents are not properly considered. Meanwhile, suitable contents cannot be provided to different users for enhancing the users' learning motivation. It is also one of the key factors of successful mobile learning as how to provide contents in combination with the presently resourceful contents on the network and the requirements and preferences of the user, so as to enhance efficiency and interest of learning.

Moreover, since the storage space of the portable device is relatively limited, what has to be taken into consideration in mobile learning is not simply putting the information in the portable device. How to store information really interesting to the user in the limited space and how to make access quick and efficient for the user are also issues that need to be solved immediately in mobile learning.

SUMMARY OF THE INVENTION

The present invention provides a system for providing mobile information, which not only facilitates the acquisition of the information contents, but also effectively guarantees the propriety thereof and further stores information really interesting to the user in the limited space, thus the user can access information quickly and efficiently.

The present invention provides a method for providing mobile information, which takes the broadness and variety of the contents as well as the limited space into consideration and makes the user access information really interesting to him/her quickly and efficiently without spending much time on information acquisition.

The present invention provides a server that extracts and classifies information really interesting to the user automatically so as to make it convenient for browsing or managing the contents by the user. Furthermore, the server determines the most suitable files to be downloaded automatically, thereby stores information really interesting to the user in the limited space.

The present invention provides a portable device, which provides an intelligent browse mode, and determines the browse sequence of files according to the interest of the user, the browse record, and the like, thus the user can access the information quickly.

The present invention provides a system for providing mobile information, which comprises a server and a portable device for downloading multiple files and a file browse rule from the server. The server includes an intelligent download manager, and the portable device includes the file browse manager. This file browse manager provides an intelligent browse mode related to the browse sequence of the downloaded files according to the file browse rule. In addition, the portable device provides the file browse record to the server. The intelligent download manager determines a downloaded file update rule (also referred to as file replacement rule) and a file browse rule according to any combination of a document attribute, a browse record, and a document preference. The intelligent download manager then determines files to be downloaded to the portable device according to the downloaded file update rule.

According to the system for providing mobile information described in the embodiment of the present invention, the intelligent download manager computes document priority scores according to a document attribute, a browse record, and a document preference. The document priority score is represented as:

$$S(D) = \text{Score}(A(D), H(D), P_D),$$

wherein $S(D)$ is the document priority score;
$A(D)$ is the document attribute;
$H(D)$ is the browse record;
and $P_D$ is the document preference.

The intelligent download manager determines the downloaded file update rule according to the document priority score $S(D)$, the available space M in the portable device, and the file update strategy preference $P_U$. Meanwhile, the intelligent download manager determines above file browse rule according to the document priority score $S(D)$ and the file browse strategy preference $P_N$.

According to the system for providing mobile information described in the embodiment of the present invention, the file browse manager can determine the browse sequence of the files according to the file browse rule and the browse record. In addition, the server may further include an article extractor, which automatically extracts the files of articles really interesting to the user according to the browsing habits of the user, and then stores the files into a document base. Furthermore, the server may also include an article classifier, which classifies the article files according to the preference settings of the user, and then stores the files into the document base for convenient browsing or content management. In addition, the system of the embodiment may include a text-to-speech element disposed in the server or the portable device for converting text information into speech information, thereby enabling the user to obtain information by way of listening.

From another viewpoint of the present invention, the present invention provides a method for providing mobile information, which comprises the following steps. First, a downloaded file update rule and a file browse rule are determined according to any combination of a document attribute, a browse record, and a document preference. Then, files to be downloaded are determined according to the downloaded file update rule. Then, the server downloads the files and the file browse rule to the portable device. In addition, an intelligent browse mode related to the browse sequence of the files is provided according to the file browse rule.

According to the method for providing mobile information described in the embodiment of the present invention, the step of determining the downloaded file update rule and the file browse rule includes the following steps. First, a document priority score is computed according to a document attribute, the browse record, and the document preference. The document priority score is represented as:

$$S(D)=\text{Score}(A(D),H(D),P_D),$$

wherein $S(D)$ is the document priority score;
$A(D)$ is the document attribute;
$H(D)$ is the browse record;
and $P_D$ is the document preference.

Then, the downloaded file update rule is determined according to the document priority score $S(D)$, the available space M in the portable device, and the file update strategy preference $P_U$. In addition, the file browse rule is determined according to the document priority score $S(D)$ and the file browse strategy preference $P_N$.

According to the method for providing mobile information described in the embodiment of the present invention, the portable device provides the available space M and the browse record about browsing the files to the server. In addition, the method of the embodiment further originally or dynamically determines the browse sequence of the files according to the file browse rule and the browse record. The method of the embodiment may further comprise the following steps. First, the files of articles really interesting to the user are automatically extracted according to the browsing habit of the user, and stored in the document base. Then, the article files are classified according to the preference settings of the user, and stored in the document base for convenient browsing or content management. Furthermore, the method of the present embodiment can further convert text information into speech information, thereby enabling the user to obtain information by way of listening.

According to the description of the embodiment of the present invention, in either the above system or method for providing mobile information, the document attribute $A(D)$ may be determined according to the document type $T(D)$ and the document length $L(D)$. The browse record $H(D)$ may be determined according to browse history state of the file, including unread state, read state, skipped state, and repeated state. A proper method is that the browse record $H(D)$ is computed as below.

If the browse history state is an unread state, $H(D)=0$;
if it is a read state, $H(D)=1*\mu(x)$;
if it is a skipped state, $H(D)=-1*\mu(x)$; and
if it is a repeated state, $H(D)=\Sigma(H(D))_{ti}$,
wherein, x is the percentage of files having been read;
$\mu$ is a fuzzy membership function;
and $(H(D))_{ti}$ represents the browse history state of the $t_i$th reading when the file has been read repeatedly.

The document preference $P_D$ can be determined according to the type weight of the document type of file. The document type weight $W(T(D))$ of the document type $T(D)$ can be adjusted according to the browse record $H(D)$ of all the files of the document type $T(D)$, and it can be represented as:

$$(W_i)_{new}=(W_i)_{old}+\sigma*\Sigma H(D_i)/\text{Num}(D_i),$$

wherein $D_i$ is the file of document type $T_i$;
$\text{Num}(D_i)$ is the number of the files of document type $T_i$;
$\sigma$ is a predetermined adjustment parameter;
and $W_i$ is the type weight of the document type $T_i$.

In addition, the document priority score $S(D)$ can be represented with the following formula:

$$S(D)=\alpha*W(T(D))*(1-|H(D)|)+\beta*L(D),$$

wherein $\alpha$ is the type priority parameter,
and $\beta$ is the length priority parameter.

In the embodiments, the type priority parameter $\alpha$ is much greater than the length priority parameter $\beta$.

According to the description of the embodiment of the present invention, in the above system or method for providing mobile information, the file update strategy preference $P_U$ may be determined according to one guideline selected from between the resulted value optimization and the classification distribution uniformity.

The server or portable device provided according to another viewpoint of the present invention have been explicitly described in the above system for providing mobile information, and the details will not be described again.

The server of the present invention includes an intelligent download manager, and the portable device includes a file browse manager. The intelligent download manager determines the downloaded file update rule and the above file browse rule according to any combination of a document attribute, a browse record, and a document preference. Files to be downloaded to the portable device can be determined automatically according to the downloaded file update rule. The file browse manager provides an intelligent browse mode related to the browse sequence of the downloaded files according to the above file browse rule. Therefore, the present invention not only facilitates the acquisition of information contents, but also effectively guarantees the propriety thereof, and further stores information really interesting to the user in the limited space, thus the user can access information quickly and efficiently.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the invention.

DESCRIPTION OF EMBODIMENTS

Figure 1:
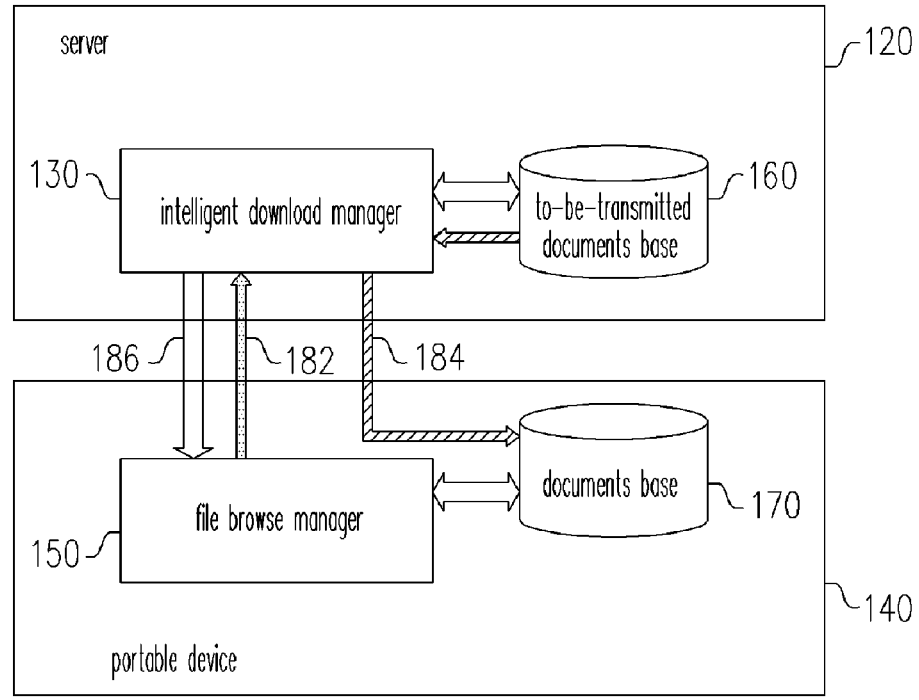
FIG. 1 shows a block diagram of a system for providing mobile information according to an embodiment of the present invention.

FIG. 1 shows a block diagram of a system for providing mobile information according to an embodiment of the present invention. Referring to FIG. 1, a system for providing mobile information provided by the present invention comprises a server 120 and a portable device 140. The server 120 includes an intelligent download manager 130 and a to-be-transmitted document base 160. The portable device 140 includes a file browse manager 150 and a document base 170.

In order to enable the user to read information interesting to him/her anywhere and anytime, the portable device 140 is used for the user to listen to the desired information in form of speech. However, since the storage space in the portable device 140 is much more limited relative to the storage space of the server 120, the amount or the size of the article files stored in the to-be-transmitted document base 160 is likely to be larger than what can be stored in the document base 170 in the portable device 140. Therefore, the intelligent download manager 130 provided by the present invention automatically determines the files to be downloaded from the article files stored in the to-be-transmitted document base 160, according to the data relevant to storage space capacity and the browse record 182 of the file read history provided by the portable device 140, and the like. Then, the intelligent download manager 130 downloads the downloaded files 184 into the portable device 140 for being stored in the document base 170, thereby guaranteeing that the limited storage space of the portable device 140 is stored with information really interesting to the user. In addition, in order to facilitate the user to access the downloaded files quickly and efficiently, the file browse manager 150 provides an intelligent browse mode, which determines the browse sequence of the downloaded files, for example, thus enabling the user to select the article files most interesting to him/her in priority. In order to achieve this object, the intelligent download manager 130 can also download the file browse rule 186 to the file browse manager 150 for helping it to determine the browse sequence of the downloaded files. The communication and data transmission between the above server 120 and the portable device 140 can be realized in a wired or wireless way.

Figure 2:
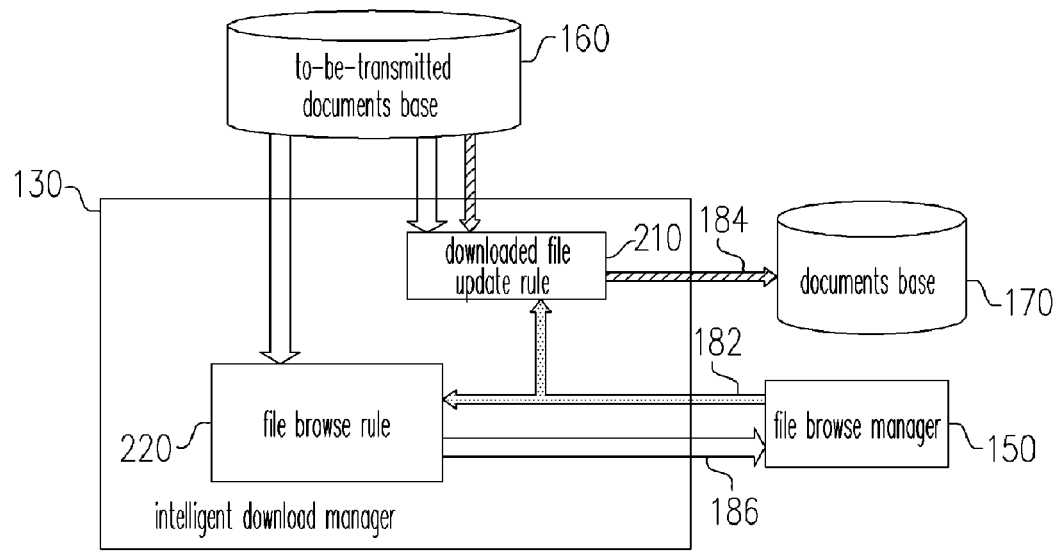
FIG. 2 shows a block diagram of an intelligent download manager in FIG. 1.

FIG. 2 shows a block diagram of an intelligent download manager in FIG. 1. Referring to FIG. 2, the file browse manager 150 provides data such as the storage space capacity and the browse record 182 of the files to the intelligent download manager 130. The intelligent download manager 130 determines the downloaded file update rule 210 and the file browse rule 220 according to a document attribute, a browse record, and a user's document preference. Then, the intelligent download manager 130 determines the files to be downloaded to the portable device according to the downloaded file update rule 210, and downloads the downloaded files 184 to the document base 170 from the to-be-transmitted document base 160. Meanwhile, the file browse rule 220 is downloaded to the file browse manager 150. The file browse manager 150 provides an intelligent browse mode related to the browse sequence of the downloaded files according to the downloaded file browse rule.

The intelligent download manager 130 determines the downloaded file update rule 210 and the file browse rule 220 mainly according to three factors including a document attribute, a browse record, and a user's document preference. However, these factors are not intended to limit the present invention. The present invention can adopt any combination of the above three. For example, the intelligent download manager 130 may determine the downloaded file update rule 210 and the file browse rule 220 only according to a document attribute and the browse record, or even only according to a single factor: the browse record. Of course, other factors that may influence the file update and browse can all be the basis of the intelligent download manager 130. How to determine the downloaded file update rule 210 and the file browse rule 220 is described in detail with examples as below.

The present embodiment is not intended to determine the above two rules directly but to get the document priority scores of the article files in the to-be-transmitted document base 160. The intelligent download manager 130 computes the document priority score according to a document attribute, the browse record and the document preference. The document priority score is represented as:

$$S(D) = \text{Score}(A(D), H(D), P_D),$$

wherein, S(D) is the document priority score; A(D) is the document attribute representing the attributes of the article file D, such as the type and length of the document; H(D) is the browse record representing the browse history state of the article file D, which for example includes unread state, read state, skipped state, repeated state, and the like; and $P_D$ is the document preference representing the document preference of the article file D, for example, the user's relative preference for different document types, and the like, and the document preference can be updated and adjusted according to the browse record of the documents.

In particular, the document attribute A(D) can be determined according to the document type T(D) and the document length L(D) of the article file. Taking the news-article files for example, the document type T(D) includes, for example, sports, finance and economics, movie and TV entertainment, politics, and the like. The browse record H(D) can be determined according to the browse history state of the article file. A proper method is that the browse record H(D) is computed as below:

If the browse history state is an unread state, H(D)=0;
if it is a read state, H(D)=1*μ(x);
if it is a skipped state, H(D)=−1*μ(x); and
if it is a repeated state, $H(D) = \Sigma (H(D))_{ti}$, wherein x is the percentage of files having been read; μ is a fuzzy membership function; and $(H(D))_{ti}$ represents the browse history state of the $t_i$th reading when the file has been read repeatedly. Taking news articles for example, read article files tend to be deleted, and skipped article files also tend to be deleted. In addition, since the user may have different preferences for article files of different document types, the document preference $P_D$ can be determined according to the type weight of the document type of the file. The type weight W (T(D)) of the document type T(D) can be adjusted according to the browse record H(D) of all the files of document type T(D), and it can be represented as:

$$(W_i)_{new}=(W_i)_{old}+\sigma*\Sigma H(D_i)/\text{Num}(D_i),$$

wherein $D_i$ is the file of document type Ti; $W_i$ is the type weight of the document type Ti; $\text{Num}(D_i)$ is the number of the files of document type Ti; and $\sigma$ is a predetermined adjustment parameter representing the possibility and importance of conducting adjustment according to the read history, for example, the bigger the numerical value of $\sigma$ is, the more possible the adjustment is conducted according to the read history. For example, if there are five article files of the document type of movie and TV entertainment, one of them has been completely read and the other four have been completely skipped, and the original type weight of article files of this type is 0.6, and the numerical value of $\sigma$ is 0.5, then the new type weight of the article files of this type is adjusted to 0.3 according to the formula:

$$0.6+0.5*(1*1+4*-1)/5=0.3.$$

Type weight can also be used to determine the arrangement sequence of the files, i.e. to influence the browse sequence of the files. Now it is attempted to enumerate some examples of adjusting the type weights with the browse record H(D), and thus changing the arrangement sequence of the files as below. There are twelve files, which are classified into four document types T(D), for example, {TYPE 1: sports, TYPE 2: life, TYPE 3: politics, TYPE 4: finance and economics}. The number of files of each document type is three, and the numerical value of $\sigma$ is 0.25. If

| T(D) | 1 | 1 | 1 | 2 | 2 | 2 | 3 | 3 | 3 | 4 | 4 | 4 |
|------|---|---|---|---|---|---|---|---|---|---|---|---|
| H(D) | -1 | -1 | 1 | 1 | 1 | 1 | 1 | -1 | -1 | 1 | 1 | 1, | and the original type weight is represented as:
type weight$_{old}$: {0.5, 0.4, 0.3, 0.2},
the computed new type weight is represented as:
type weight$_{new}$: {0.42, 0.65, 0.22, 0.45}.
Apparently, now the type weight of TYPE 2 is the highest, so files of TYPE 2 should be arranged as the first ones in the new arrangement sequence, thus:

| T(D) | 2 | 2 | 2 | 4 | 4 | 4 | 1 | 1 | 1 | 3 | 3 | 3 |
|------|---|---|---|---|---|---|---|---|---|---|---|---|
| H(D) | 1 | -1 | -1 | 1 | 1 | 1 | -1 | 0 | 0 | 0 | 0 | 0 |

Here,
type weight$_{old}$ is represented as {0.42, 0.65, 0.22, 0.45},
and after a computation once again the new type weight is represented as:
type weight$_{new}$: {0.34, 0.57, 0.22, 0.70}.
Here, the type weight of TYPE 4 becomes the highest, so files of TYPE 4 should be arranged as the first ones in the new arrangement sequence, thus:

| T(D) | 4 | 4 | 4 | 2 | 2 | 2 | 1 | 1 | 1 | 3 | 3 | 3 |
|------|---|---|---|---|---|---|---|---|---|---|---|---|
| H(D) | -1 | 1 | 1 | -1 | 1 | 1 | -1 | 1 | -1 | 1 | 1 | 1 |

Here,
type weight$_{old}$ is represented as {0.34, 0.57, 0.22, 0.70},
and after a computation once again the new type weight is represented as:
type weight$_{new}$: {0.26, 0.65, 0.47, 0.78}.

Therefore, the latest arrangement sequence can be done as long as files of TYPE 1 and files of TYPE 3 are exchanged.

In addition, the document priority score S(D) of the embodiment can be represented directly as the following formula:

$$S(D)=\alpha*W(T(D))*(1-|H(D)|)+\beta*L(D),$$

wherein $\alpha$ is the type priority parameter; and $\beta$ is the length priority parameter. The numerical values of $\alpha$ and $\beta$ are used to determine whether the document type of the file or the length of the file is prior. In this embodiment, the type priority parameter $\alpha$ is much greater than the length priority parameter $\beta$.

For example, it is supposed that $\alpha=2000$, $\beta=-1$, and the original type weight is {0.5, 0.4, 0.3, 0.2}. If the original arrangement sequence of the files is:

| Number | T(D) | H(D) | Length | S(D) |
|--------|------|------|--------|------|
| 1 | 1 | -1 | 100 | -100 |
| 2 | 1 | 0 | 140 | 860 |
| 3 | 2 | 0 | 300 | 500 |
| 4 | 2 | 0 | 100 | 700 |
| 5 | 3 | 1 | 402 | -402 |
| 6 | 3 | 1 | 200 | -200 |
| 7 | 4 | 0 | 100 | 300 |
| 8 | 4 | 1 | 43 | -43, | the computed new arrangement sequence of the files is:

| Number | T(D) | H(D) | Length | S(D) |
|--------|------|------|--------|------|
| 2 | 1 | 0 | 140 | 860 |
| 4 | 2 | 0 | 100 | 700 |
| 3 | 2 | 0 | 300 | 500 |
| 7 | 4 | 0 | 100 | 300 |
| 8 | 4 | 1 | 43 | -43 |
| 1 | 1 | -1 | 100 | -100 |
| 6 | 3 | 1 | 200 | -200 |
| 5 | 3 | 1 | 402 | -402 |

After the document priority score S(D) is obtained by computing, the intelligent download manager 130 determines the downloaded file update rule according to this document priority score S(D), the available space M in the portable device, and the file update strategy preference $P_U$. The file update strategy preference $P_U$ can be determined according to the guideline of the resultant value optimization (also referred to as the Knapsack problem) or of the classification distribution uniformity (also referred to as Interleaved replacement).

After the document priority score S(D) is computed, the intelligent download manager 130 determines the file browse rule according to the document priority score S(D) and the file browse strategy preference $P_N$. The file browse manager 150 can determine the browse sequence of the files directly, referred as static ordering, according to the downloaded file browse rule. In addition, the file browse manager 150 can also determine the browse sequence of the files dynamically, referred as dynamic ordering, according to the file browse rule and the browse record about browsing the files.

Figure 3:
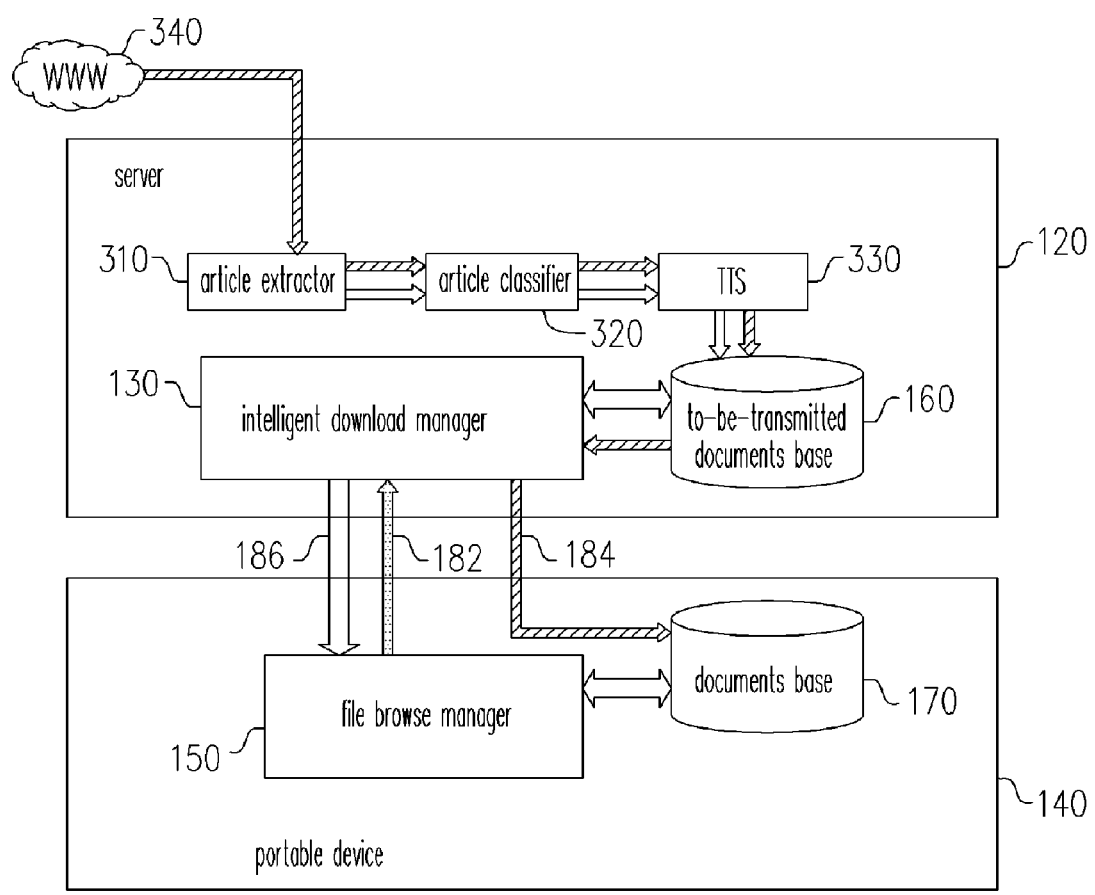
FIG. 3 shows a block diagram of a system for providing mobile information according to another embodiment of the present invention.

FIG. 3 shows a block diagram of a system for providing mobile information according to another embodiment of the present invention. Referring to FIG. 3, besides the means in FIG. 1, the server 120 further includes an article extractor 310, an article classifier 320, and a text-to-speech element (TTS for short) 330. The same parts of FIG. 3 and FIG. 1 will not be described again. This article extractor 310 automatically extracts the files of the articles really interesting to the user, for example, from the Internet 340 according to the browsing habit of the user, and stores the files directly into a to-be-transmitted document base. Alternatively, furthermore, this article classifier 320 classifies the article files according to the preference settings of the user and then stores the files into the to-be-transmitted document base for convenient browsing or content management. The TTS element 330 converts text information into speech information, thereby enabling the user to obtain information more conveniently by way of listening. It should be noted that this TTS element 330 is not restricted within the server 120; instead, it can be disposed in the server 120 or the portable device 140 depending on the applicable environment.

In the above embodiment, both the downloaded file update rule and the file browse rule are determined by the server; however, this is not intended to limit the present invention. They could also be determined by the portable device as long as the computing capacity and computing space of the portable device or the communication bandwidth are sufficient. The server can also has a file browse manager to help the user to access the files interesting to him/her from the server quickly and efficiently.

The server or portable device provided according to another viewpoint of the present invention have been explicitly described in the above system for providing mobile information, and the details will not be described again.

In the system of the above two embodiments, the present invention further provides a method for providing mobile information. The method comprises the following steps. First, a downloaded file update rule and a file browse rule are determined according to a document attribute, a browse record, and a document preference. Then, files to be downloaded are determined according to the downloaded file update rule. Then, the server downloads the files and the file browse rule to the portable device. In addition, an intelligent browse mode related to the browse sequence of the files is provided according to the file browse rule.

To determine the downloaded file update rule and the file browse rule, it includes the following steps. First, a document priority score is computed according to a document attribute, the browse record, and the document preference. The document priority score is represented as:

$$S(D)=\text{Score}(A(D),H(D),P_D),$$

wherein, S(D) is the document priority score; A(D) is the document attribute; H(D) is the browse record; and $P_D$ is the document preference. Then, the downloaded file update rule is determined according to the document priority score S(D), the available space M in the portable device, and the file update strategy preference $P_U$. In addition, the file browse rule is determined according to the document priority score S(D) and the file browse strategy preference $P_N$. The method of how to determine the downloaded file update rule and the file browse rule in detail is the same as the method in the system aforementioned, so it will not be described again.

In the above method for providing mobile information, the portable device can provide the available space M and the browse record about browsing the files to the server. In addition, the method can further determine the browse sequence of the files according to the file browse rule and the browse record originally (static ordering) or dynamically (dynamic ordering).

The above method for providing mobile information further comprises the following steps. First, the files of the articles interesting to the user are automatically extracted according to the browsing habit of the user and are stored into the document base. Then, the article files are classified according to the preference settings of the user and are stored into the document base for convenient browsing or content management. Furthermore, the above method for providing mobile information can further convert text information into speech information, thereby enabling the user to obtain information by way of listening.

The server of the present invention includes an intelligent download manager, and the portable device includes a file browse manager. The intelligent download manager determines the downloaded file update rule and the above file browse rule according to a document attribute, a browse record, and a document preference. Files to be downloaded to the portable device can be determined automatically according to the downloaded file update rule and the above file browse rule. The file browse manager provides an intelligent browse mode related to the browse sequence of the downloaded files according to the file browse rule. Therefore, the present invention not only facilitates the acquisition of information contents, but also effectively guarantees the propriety thereof and further stores information really interesting to the user in the limited space, thus the user can access this information quickly and efficiently.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for providing mobile information, comprising:
a server, including an intelligent download manager; and
a portable device, coupled to the server, for downloading multiple files and a file browse rule from the server; wherein, the portable device includes a file browse manager, which provides an intelligent browse mode which was used for determining a browse sequence of the files according to the file browse rule; and the portable device provides a browse record representing a browse history state of each of the files to the server,
the intelligent download manager determines a downloaded file update rule and the file browse rule according to any combination of a document attribute, the browse record, and a document preference; the intelligent download manager determines the files to be downloaded to the portable device according to the downloaded file update rule;
wherein the intelligent download manager computes a document priority score according to the document attribute, the browse record, and the document preference, the document priority score is presented as:

$$S(D)=\text{Score}(A(D),H(D),P_D),$$

wherein S(D) is the document priority score;
A(D) is the document attribute;
H(D) is the browse record;
$P_D$ is the document preference;
the intelligent download manager determines the downloaded file update rule according to the document priority score S(D), an available M of the portable device, and a file update strategy preference $P_U$; the intelligent download manager determines the file browse rule according to the document priority score S(D) and a file browse strategy preference $P_N$;

wherein the document attribute A(D) is determined according to a document type T(D) and a document length L(D); and wherein the browse record H(D) is determined according to the browse history state of the files, and the browse history state of the files includes unread state, read state, skipped state, and repeated state.

2. The system for providing mobile information as claimed in claim 1, wherein the browse record H(D) is computed as below:

if the browse history state is an unread state, H(D)=0;
if it is a read state, H(D)=1*µ(*X);
if it is a skipped state, H(D)=−1*µ(*X); and
if it is a repeated state, H(D)=Σ(H(D))$_{ti}$,
wherein x is the percentage of files having been read;
µ is a fuzzy membership function;
(H(D))$_{ti}$ represents the browse history state of the $t_i$th reading when the file has been read repeatedly.

3. The system for providing mobile information as claimed in claim 2, wherein the document preference P$_D$ is determined according to a type weight of the document type of the file.

4. The system for providing mobile information as claimed in claim 3, wherein the type weight W(T(D)) of the document type T(D) is adjusted according to the browse record H(D) of all the files of the document type T(D), and the type weight W(T(D)) is presented as:

$(W_i)_{new}=(W_i)_{old}+\sigma*\Sigma H(D_i)/\text{Num}(D_i)$, wherein $D_i$ is a file of document type Ti;
Num($D_i$) is the number of the files of document type Ti;
σ is a predetermined adjustment parameter;
$W_i$ is the type weight of the document type Ti.

5. The system for providing mobile information as claimed in claim 4, wherein the document priority score S(D) is represented by the following formula:

$S(D)=\alpha*W(T(D))*(1-|H(D)|)+\beta*L(D)$ wherein α is a type priority parameter;
β is a length priority parameter.

6. The system for providing mobile information as claimed in claim 5, wherein the type priority parameter α is greater than the length priority parameter β.

7. The system for providing mobile information as claimed in claim 1, wherein the file browse manager determines the browse sequence of the files according to the file browse rule and the browse record.

8. The system for providing mobile information as claimed in claim 1, wherein the server further includes an article extractor, which automatically extracts an article file interesting to a user according to a browsing habit of the user and stores it into a document base.

9. The system for providing mobile information as claimed in claim 8, wherein the server further includes an article classifier, which classifies the article file according to the preference settings of the user and stores it into the document base for convenient browsing or content management.

10. The system for providing mobile information as claimed in claim 1, further comprising a text-to-speech element, which is disposed in one of the server and the portable device for converting text information into speech information, thereby enabling a user to obtain information by way of listening.

11. A method for providing mobile information, comprising:

determining a downloaded file update rule and a file browse rule according to any combination of a document attribute, a browse record representing a browse history state of each of the files, and a document preference;
determining the files to be downloaded according to the downloaded file update rule;
downloading the files and the file browse rule to a portable device by a server; and
providing an intelligent browse mode which is used for determining a browse sequence of the files according to the file browse rule;
wherein the step of determining the downloaded file update rule and the file browse rule comprises:
computing a document priority score according to the document attribute, the browse record, and the document preference, represented as:

$S(D)=\text{Score}(A(D),H(D),P_D)$, wherein S(D) is the document priority score;
A(D) is the document attribute;
H(D) is the browse record;
P$_D$ is the document preference;
determining the downloaded file update rule according to the document priority score S(D), an available space M of the portable device, and a file update strategy preference P$_U$; and
determining the file browse rule according to the document priority score S(D) and a file browse strategy preference P$_N$;
wherein the document attribute A(D) is determined according to a document type T(D) and a document length L(D); and
wherein the browse record H(D) is determined according to the browse history state of the files, and the browse history state of the files includes unread state, read state, skipped state, and repeated state.

12. The method for providing mobile information as claimed in claim 11, wherein the browse record H(D) is computed as below:

if the browse history state is an unread state, H(D)=0;
if it is a read state, H(D)=1*µ(*X);
if it is a skipped state, H(D)=−1*µ(*X); and
if it is a repeated state, H(D)=Σ(H(D))$_{ti}$,
wherein x is the percentage of files having been read;
µ is a fuzzy membership function;
(H(D))$_{ti}$ represents the browse history state of the $t_i$th reading when the file has been read repeatedly.

13. The method for providing mobile information as claimed in claim 12, wherein the document preference P$_D$ is determined according to a type weight of the document type of the file.

14. The method for providing mobile information as claimed in claim 13, wherein the type weight W (T(D)) of the document type T(D) is adjusted according to the browse record H(D) of all the files of the document type T(D), and the type weight W (T(D)) is represented as:

$(W_i)_{new}=(W_i)_{old}+\sigma*\Sigma H(D_i)/\text{Num}(D_i)$, wherein $D_i$ is a file of document type Ti;
Num($D_i$) is the number of the files of document type Ti;
σ is a predetermined adjustment parameter;
$W_i$ is the type weight of the document type Ti.

15. The method for providing mobile information as claimed in claim 14, wherein the document priority score S(D) is represented as the following formula:

$S(D)=\alpha*W(T(D))*(1-|H(D)|)+\beta*L(D)$ wherein α is a type priority parameter;
β is a length priority parameter.

16. The method for providing mobile information as claimed in claim 15, wherein the type priority parameter $\alpha$ is greater than the length priority parameter $\beta$.

17. The method for providing mobile information as claimed in claim 11, further comprising: providing the available space M and the browse record about browsing the files to the server by the portable device.

18. The method for providing mobile information as claimed in claim 11, further comprising determining the browse sequence of the files according to the file browse rule and the browse record.

19. The method for providing mobile information as claimed in claim 11, further comprising:
automatically extracting an article file interesting to a user according to the browsing habit of the user and storing it into a document base.

20. The method for providing mobile information as claimed in claim 19, further comprising:
classifying the article file according to the preference settings of the user and storing it into the document base for convenient browsing or content management.

21. The method for providing mobile information as claimed in claim 11, further comprising:
converting text information into speech information, thereby enabling a user to obtain information by way of listening.

22. A server for downloading multiple files and a file browse rule to a portable device, including an intelligent download manager; wherein, the intelligent download manager determines a downloaded file update rule and the file browse rule according to any combination of a document attribute, a browse representing a browse history state of each of the files in the portable device, and a document preference; the intelligent download manager determines the files to be downloaded to the portable device according to the downloaded file update rule; and the portable device provides an intelligent browse mode which is used for determining a browse sequence of the files according to the file browse rule wherein the intelligent download manager computes a document priority score according to the document attribute, the browse record, and the document preference, the document priority score is represented as:

$$S(D)=\text{Score}(A(D),H(D),P_D),$$

wherein S(D) is the document priority score;
A(D) is the document attribute;
H(D) is the browse record;
$P_D$ is the document preference;
the intelligent download manager determines the downloaded file update rule according to the document priority score S(D), an available M of the portable device, and a file update strategy preference $P_U$; the intelligent download manager determines the file browse rule according to the document priority score S(D) and a file browse strategy preference $P_N$;
wherein the document attribute A(D) is determined according to a document type T(D) and a document length L(D); and
wherein the browse record H(D) is determined according to a browse history state of the files, and the browse history state of the files includes unread state, read state, skipped state, and repeated state.

23. The server as claimed in claim 22, wherein the browse record H(D) is computed as below:
if the browse history state is an unread state, H(D)=0;
if it is a read state, H(D)=1*$\mu$(*X);
if it is a skipped state, H(D)=−1*$\mu$(*X); and
if it is a repeated state, $H(D)=\Sigma(H(D))_{ti}$,
wherein x is the percentage of files having been read;
$\mu$ is a fuzzy membership function;
$(H(D))_{ti}$ represents the browse history state of the $t_i$th reading when the file has been read repeatedly.

24. The server as claimed in claim 23, wherein the document preference $P_D$ is determined according to a type weight of the document type of the file.

25. The server as claimed in claim 24, wherein the type weight W (T(D)) of the document type T(D) is adjusted according to the browse record H(D) of all the files of the document type T(D), and the type weight W (T(D)) is represented as:

$$(W_i)_{new}=(W_i)_{old}+\sigma*\Sigma H(D_i)/\text{Num}(D_i),$$

wherein $D_i$ is a file of document type Ti;
Num($D_i$) is the number of the files of document type Ti;
$\sigma$ is a predetermined adjustment parameter;
$W_i$ is the type weight of the document type Ti.

26. The server as claimed in claim 25, wherein the document priority score S(D) is represented as the following formula:

$$S(D)=\alpha*W(T(D))*(1-|H(D)|)+\beta*L(D)$$

wherein $\alpha$ is a type priority parameter;
$\beta$ is a length priority parameter.

27. The server as claimed in claim 26, the type priority parameter $\alpha$ is greater than the length priority parameter $\beta$.

28. The server as claimed in claim 22, further comprising an article extractor, which automatically extracts an article file interesting to a user according to browsing habits of the user and stores it into a document base.

29. The server as claimed in claim 28, further comprising an article classifier, which classifies the article file according to the preference settings of the user and stores it into the document base for convenient browsing or content management.

30. The server as claimed in claim 22, further comprising a text-to-speech element for converting text information into speech information, thereby enabling a user to obtain information by way of listening.

31. A portable device for downloading multiple files and a file browse rule from a server, the portable device comprising:
A memory for storing the multiple files and the file browse rule downloaded from the server; and
A processor configured with a file browse manager, providing an intelligent browse mode which is used for determining a browse sequence of the files according to the file browse rule, wherein the portable device provides a browse record representing a browse history state of each of the files to the server, and the server determines a downloaded file update rule the file browse rule and the files to be downloaded to the portable device according to any combination of a document attribute, the browse record, and a document preference;
wherein the step of determining the downloaded file update rule and the file browse rule comprises:
computing a document priority score according to the document attribute, the browse record, and the document preference, represented as:

$$S(D)=\text{Score}(A(D),H(D),P_D),$$

wherein S(D) is the document priority score;
A(D) is the document attribute;
H(D) is the browse record;
$P_D$ is the document preference;

determining the downloaded file update rule according to the document priority score S(D), an available space M of the portable device, and a file update strategy preference $P_U$; and determining the file browse rule according to the document priority score S(D) and a file browse strategy preference $P_N$;

wherein the document attribute A(D) is determined according to a document type T(D) and a document length L(D); and wherein the browse record H(D) is determined according to the browse history state of the files, and the browse history state of the files includes unread state, read state, skipped state, and repeated state.

32. The portable device as claimed in claim 31, wherein the file browse manager determines the browse sequence of the files according to the file browse rule and the browse record.

33. The portable device as claimed in claim 31, further including a text-to-speech element for converting text information into speech information, thereby enabling a user to obtain information by way of listening.

* * * * *